United States Patent
Mankar et al.

(10) Patent No.: US 9,036,796 B2
(45) Date of Patent: May 19, 2015

(54) GENERATING ACTION TUPLES IN RESPONSE TO DISCERNED LEADS

(75) Inventors: Vinod Vinayak Mankar, Bangalore (IN); Natwar Modan, New Delhi (IN); Amit Anil Nanavati, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/616,031

(22) Filed: Sep. 14, 2012

(65) Prior Publication Data

US 2014/0079198 A1 Mar. 20, 2014

(51) Int. Cl.
*H04M 11/00* (2006.01)
*G06Q 50/00* (2012.01)
*G06Q 30/02* (2012.01)
*H04M 3/487* (2006.01)
*H04M 7/00* (2006.01)

(52) U.S. Cl.
CPC ............. *G06Q 50/01* (2013.01); *G06Q 30/02* (2013.01); *H04M 3/4878* (2013.01); *H04M 7/0024* (2013.01); *H04M 2203/655* (2013.01)

(58) Field of Classification Search
CPC .......... G06Q 30/0241; G06Q 30/0255; G06Q 30/0254; G06Q 50/01
USPC ........................................ 379/90.01
See application file for complete search history.

(56) References Cited

U.S. PATENT DOCUMENTS

| | | | |
|---|---|---|---|
| 2009/0157593 A1* | 6/2009 | Hayashi et al. | 707/1 |
| 2010/0262487 A1 | 10/2010 | Edwards et al. | |
| 2011/0007882 A1 | 1/2011 | Renero Quintero et al. | |
| 2011/0173268 A1 | 7/2011 | Cai et al. | |
| 2011/0201317 A1* | 8/2011 | Karandikar et al. | 455/414.1 |
| 2011/0213741 A1* | 9/2011 | Shama et al. | 706/13 |
| 2012/0072400 A1 | 3/2012 | Allred et al. | |

OTHER PUBLICATIONS

Radunovic, Bozidar, et al., "An Optimization Framework for Practical Multipath Routing in Wireless Mesh Networks," Microsoft Research, Technical Report, Jun. 2007. 16 pages, Microsoft Corporation, Redmond, Washington, USA.

Shin, Minho, et al., "AnonySense: A System for Anonymous Opportunistic Sensing." PMC, Apr. 15, 2010, 29 pages. Can be found at http://www.ists.dartmouth.edu/library/485.pdf as of Jul. 9, 2012.

* cited by examiner

*Primary Examiner* — Amal Zenati
(74) *Attorney, Agent, or Firm* — Ference & Associates LLC

(57) ABSTRACT

Methods and arrangements for analyzing and responding to communications data. Telecom data are input, as are social network data. The telecom data and social network data are analyzed, and action tuples representing opportunistic leads are generated based on the analyzed telecom data and social network data.

16 Claims, 6 Drawing Sheets

GENERATING ACTION TUPLES IN RESPONSE TO DISCERNED LEADS

BACKGROUND

It is not uncommon for people to be on multiple social networks, and each social network provides only a partial view of the user. Telecom CDR (call data record) based analysis provides one partial view of the customer, while activity on online social networks provides another partial view of the customer. Conventionally, there is no framework that analyzes these two types of data together to provide insights on potential actions that any service provider can take.

BRIEF SUMMARY

In summary, one aspect of the invention provides a method comprising: inputting telecom data; inputting social network data; analyzing the telecom data and the social network data; and generating action tuples based on the analyzed telecom data and the analyzed social network data.

Another aspect of the invention provides an apparatus comprising: at least one processor; and a computer readable storage medium having computer readable program code embodied therewith and executable by the at least one processor, the computer readable program code comprising: computer readable program code configured to input telecom data; computer readable program code configured to input social network data; computer readable program code configured to analyze the telecom data and the social network data; and computer readable program code configured to generate action tuples based on the analyzed telecom data and the analyzed social network data.

An additional aspect of the invention provides a computer program product comprising: a computer readable storage medium having computer readable program code embodied therewith, the computer readable program code comprising: computer readable program code configured to input telecom data; computer readable program code configured to input social network data; computer readable program code configured to analyze the telecom data and the social network data; and computer readable program code configured to generate action tuples based on the analyzed telecom data and the analyzed social network data.

A further aspect of the invention provides a method comprising: inputting telecom data; inputting social network data; discerning an opportunistic lead based on the input telecom data and social network data; developing a two-dimensional graph relating to the telecom data and social network data; and mapping the opportunistic lead to at least one pattern associated with the two-dimensional graph.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
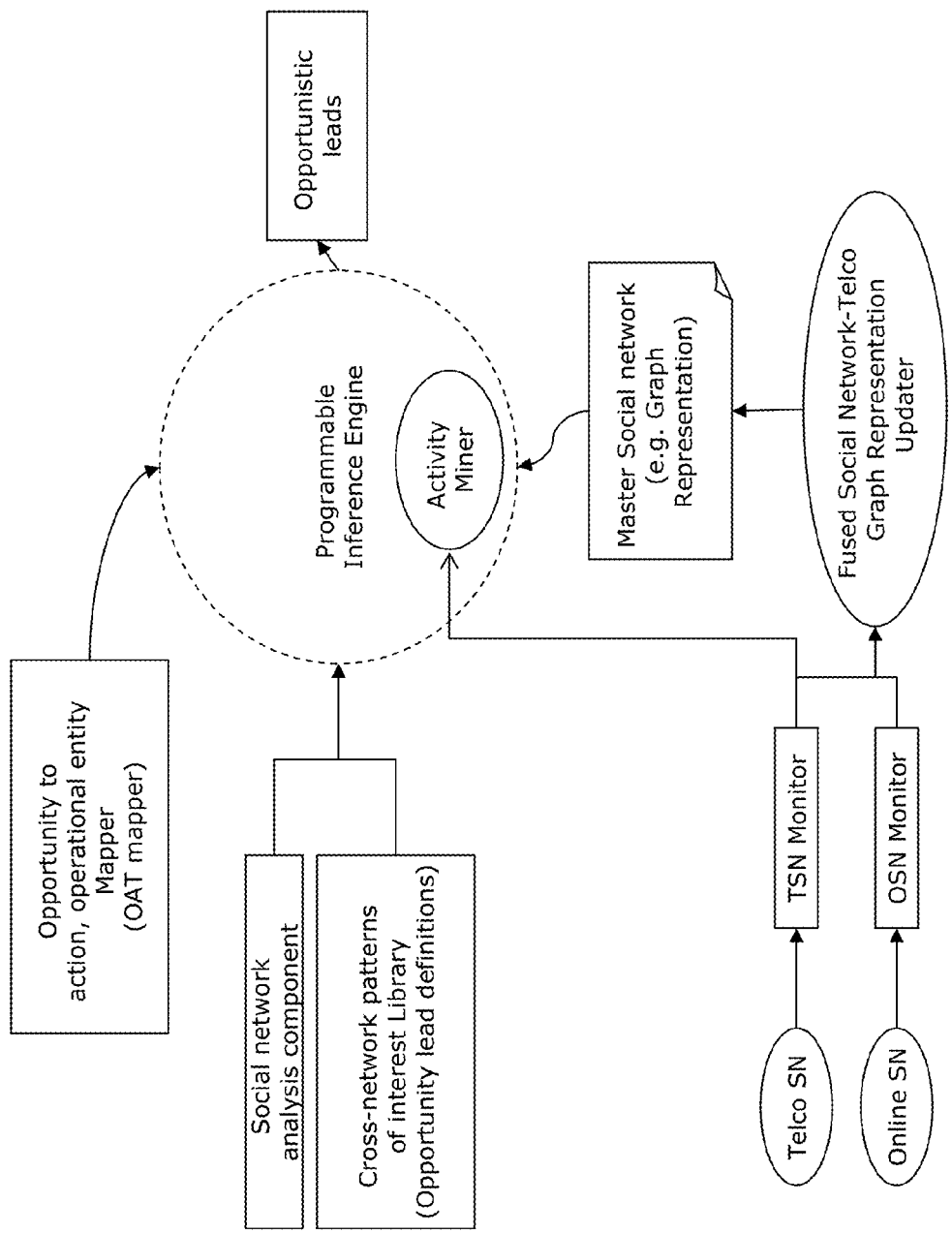
FIG. 1 schematically illustrates an overall system design.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

Broadly contemplated herein, in accordance with at least one embodiment of the invention, is a framework for generating and providing opportunistic action tuples by analyzing the two sources of data mentioned above (telecom CDRs and online social networks). "Opportunistic action tuples" refer to information or data tuples that can be generated relative to potential leads or opportunities that, based on one or more relevant criteria or guidelines, may be promising or desirable for the organization in question. Such leads or opportunities, for instance, could include marketing or sales leads, or opportunities for enhancing service to one or more targeted customers. The action tuples may be used, among other things, to: improve customer service; serve relevant promotions, products and/or services; enable personalized user experience; proactively prevent excessive back-and-forth communication; and find potential marketing targets. Two examples of "opportunistic action tuples" are:

<keyword, sentiment, department-role>
<[location], actors, [times], keyword, sentiment, department-role, action-category>.

These action tuples can be used by the Telecom operator, the OSN provider, or any other 3rd party service provider.

In accordance with at least one embodiment of the invention, monitors detect both node level and edge level opportunistic leads (that is, leads relating to opportunities that may be promising or desirable for the organization in question), as shown in the system design of FIG. 1. A telecom social network (SN) is monitored by a monitor; likewise, an online SN is monitored by another monitor. The telecom (or telco) SN can be assessed by way of elements including (but not limited to) call data records (CDRs), visitor location register (VLR) and home location register (HLR) databases, value added service (VAS) data, and network directory service (NDS) data. The online SN can be assessed by way of elements including (but not limited to) a static profile, interests, dynamic profile status, event RSVPs, location check-ins and photos. Thus, respective channel monitors detect events, or points of interest in the channel activity that need to be updated in the fused telco-social (graph) representation of the user. These event or points of interest could be defined over instantaneous events happening over the channel; e.g., these could be as simple as a user subscribing to updates from a certain football club, or expressing his sentiments of unhappiness over the service he received, or updates mined over a period of time which denote long term patterns such as a fall in usage over a period of time. It could employ any of the dictionary based, keywords based or more sophisticated data mining & analytics techniques. (For instance, in the case of an online social network, events/triggers could be programmed in the social network monitor to monitor for updates to user interests, "likes" on webpages, status updates, certain sentiments expressed in posts, keywords in posts, etc. Similarly, the telco social network monitor could monitor for events such as call duration, location, who talks to whom, presence, usage services subscribed to, etc.) These events or triggers update the requisite nodes' attributes in the fused user telco-social (network graph) representation through the SN graph updater component.

In accordance with at least one embodiment of the invention, action tuple generation can involve several elements. An OSN (online social network) monitor can undertake identification of updates/events/triggers, wherein each social network activity of interest will be logged with a time-stamp and keywords for mining later. It will lead to updating of the fused user telco-social user representation, which can be represented in graphical form. A TSN (telco social network) monitor could monitor for events/updates/triggers (as described earlier) on the telecom activity log of the user, leading to updating of the fused user telco-social (graph) representation of the user. An activity miner mines the fused telco-social user (social network graph) representation for user-specific, user social network specific and generic (statistical) information for opportunistic leads based on opportunistic lead definitions. Identification of such opportunistic leads results in generation of opportunistic tuples. An automatic rule generator generates recommendation rules based on matching OTs (opportunistic tuples) with OATs (opportunistic action tuples). (OATs match the OTs, but include more action-oriented information in terms of who—or which department—needs to act on the opportunistic leads, within what time frame, and, e.g., if there are any recommended actions if there are any like services which are not subscribed to by the user[s] but which could be recommended.) These rules can be then added to the rulebase, after validation by the administrator. Alternatively, as shown below, these rules can be entered manually by the administrator (e.g., a business intelligence [BI] individual).

In accordance with at least one embodiment of the invention, tuple generation can involve a manual rulebase. This is a set of rules, provided by the administrator, which has rules of the form LHS→RHS, where the LHS (left hand side) is made up of OTs that the Activity miner has generated based on the user actions and the RHS (right hand side) is made up of OATs as described earlier. In accordance with at least one embodiment of the invention, social zones are also defined in the context of opportunistic tuples and opportunistic action tuples. Social zones, for their part, can involve a combination of nodes and edges (which define the activity and event) shared between the nodes in the graph representation of the social network (where the graph nodes represent the people and the graph edges represent the social interactions between people). Activities of interest at social zones, among others, may include, e.g., a user is hanging out/checking in with X, Y & Z at L location and there is a discount offer at a nearby movie theater; a user has obtained a new connection and is asking friends for utilities, etc. (e.g., appears to have recently moved to the area); and user usage has dropped, and the user is criticizing the service on his social network.

In accordance with at least one embodiment of the invention, a fusion analytics framework can involve several components. A programmable correlation engine, which is the correlation engine part of the framework, analyzes the combination of OSN and TSN streams enables definition of an "opportunistic lead" and allows customized lead definition and detection between the telecom and OSN interactions. The activity miner sub-component mines for opportunistic leads in the fused user telco-social (graph) representation of the user based on opportunistic lead definitions and generates opportunistic tuples which are then mapped to opportunistic action tuples as described earlier based on the mapping available in the OAT mapper or other intelligent automated inference mechanisms described earlier. Such opportunistic leads represented through opportunistic action tuples may provide opportunities for: improving customer service; serving relevant, time and situational context sensitive promotions, products, services; enabling personalized user experience; proactively preventing churn, facilitating potential target acquisition; and finding campaign effectiveness.

In accordance with at least one embodiment of the invention, a fusion analytics framework can further involve a programmable correlation engine which would employ semantic analysis, text analysis and link analysis techniques to identify and extract opportunistic leads from the user social network and telco activities. For instance, one instance of opportunistic lead definition could be a combination of keywords, sentiments, departments, location, timeline, etc. (For instance, keywords could include "QoS", "Offers", "Churn", "3G"; sentiments could qualify the keyword; departments would represent the business unit [BU] responsible to respond: <keyword, sentiment, department-role>; <[location], actors, [times], keyword, sentiment, department-role>.) Intended consumers of the leads could be the communication service providers or retailers or 3rd party service providers. The deployment process could involve customizing/defining a set of opportunistic leads specific to the application at hand. For example, in the above scenario, it would involve defining the mapping between the "department" and the "keywords" and may involve populating an application/customer specific list of departments. The framework could then provide a list of features (or "flavors"), from which the deployer can designate particular ones for one or more particular departments or individuals. For example, a "flavor" could be defined by a complaint, question, praise or feedback. The lead definition could provide an "Action" for a single dept., "FYI" for others, etc., and an action type could be associated with such output, with one being assigned to or designated for each of one or more relevant departments. The action definition can thus be an externally configurable part where the deployer can advise the system that certain input leads to certain destinations (e.g., complaints about products get routed to customer service relations [thus, complaints→CSR, promotion leads→sales department, complains about personnel→HR [human resources], etc.).

In accordance with at least one embodiment of the invention, the opportunistic leads will have default deadlines/timelines for within which it is valid and thus action needs to be initiated within that timeframe to benefit from the lead. The lead deadline is explicitly derived from the user action or is part of the lead definition based on the system understanding of the lead. It will thus have a have pre-defined expiry, depending on the type of system inference/recommendation. Explicit expiry is based on user action, e.g., a user attending a concert at location Y on date & time Z.

Figure 2:
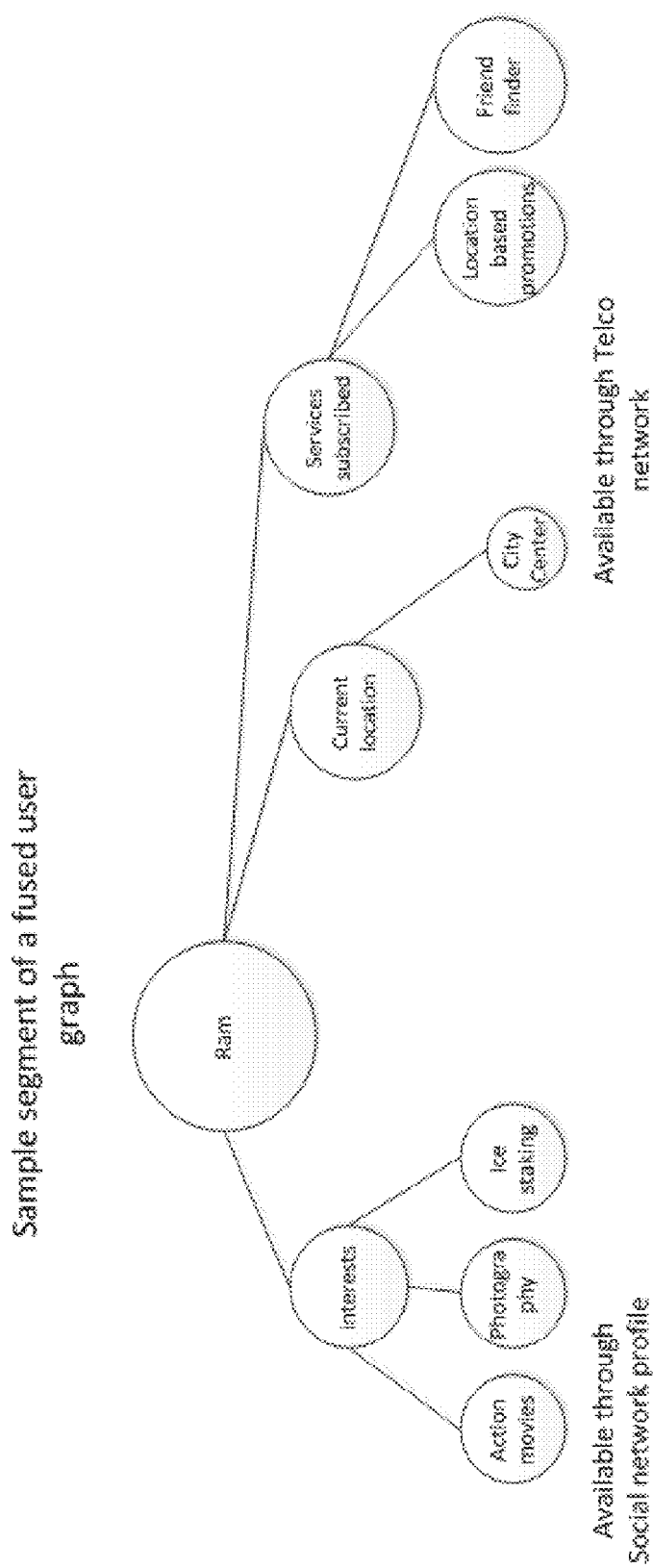
FIGS. 2 and 3 schematically illustrate sample segments of a fused user graph.
Figure 3:
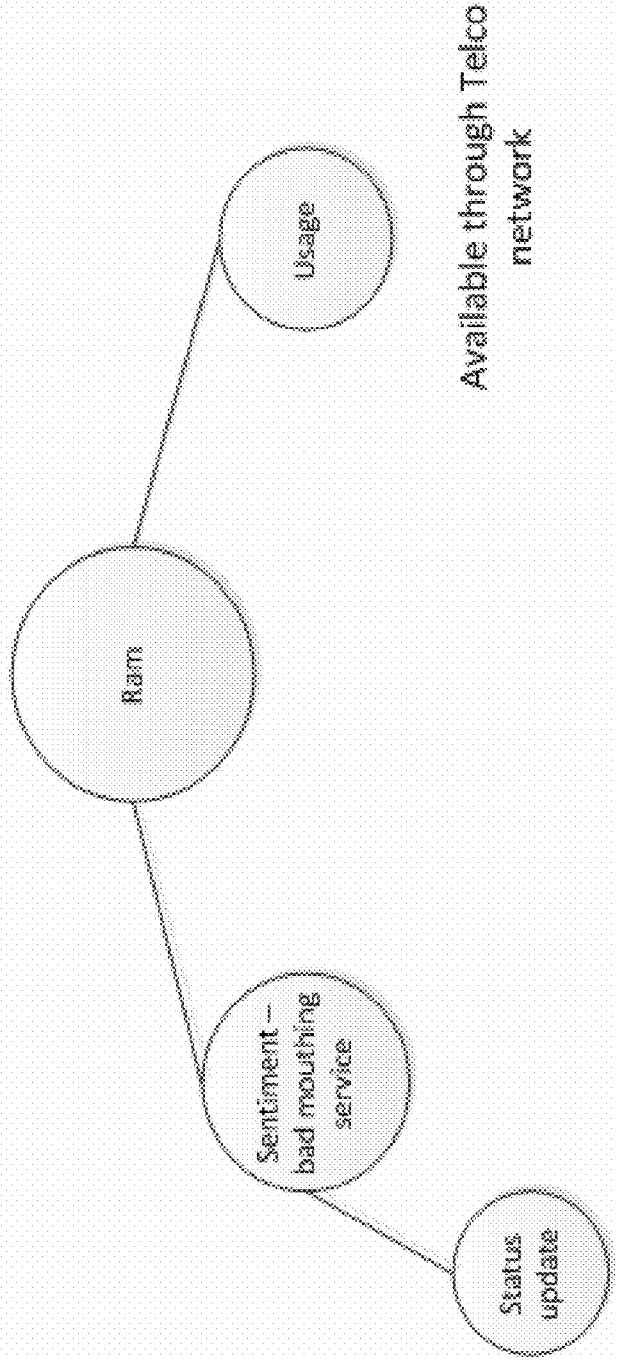

By way of an illustrative example in accordance with at least one embodiment of the invention, a possible opportunistic lead in the promotions domain, with respect to FIG. 2, could be one where the user has interests in action movies, is near the city center and has subscribed to location based promotions. A possible opportunistic tuple could look like:
   <Ram, CityCenter, 30 mins, offers, <actionmovies>.
Further, one possible representation of a corresponding OAT could be:
   <Ram, CityCenter, 30 mins, offers,<actionmovies>, promotions-dept, 15 mins.>

The OAT thus adds more action-oriented information, regarding which department (here, Promotions) to route the lead to and suggesting possible categories of action. With respect to FIG. 3, a probable opportunistic lead in the customer care domain would be one where the customer is complaining on his social network about the bad service he has received from his telco provider. A corresponding opportunistic tuple might look like:
   <Ram, customer service, unhappy, high priority>
One representation of the corresponding OAT might look like:
   <Ram, customer service, unhappy, high priority, grievance dept>.

By way of further background, in accordance with at least one embodiment of the invention, it can be appreciated that telecom providers are privy to a rich set of information that is of value in many varied ways, be it understanding real-time user demographics or driving real-time promotions and offers. Today, SNA (social network analysis) in telecom parlance is focused on the analysis of CDRs to find customer calling patterns, predicting churn, finding influential customers and so on. However, the CDR based analysis provides a limited view of the customer. Similarly, in accordance with at least one embodiment of the invention, the online social network analysis of users is limited to what the user is saying about the brand/product online, etc. However, social network providers capture user experience and interactions in near real-time, which can be of utmost value to various service providers or retailers in understanding user needs in near real time and driving service customization, quality improvement, personalized promotions, offers, store inventory management, etc., on a per-user basis. Thus, existing methods use information either from Online Social Network (OSN) or from Telecom social networks (derived from CDRs). However, the information coming from both sides is incomplete as regards the combination of the two, since there are going to be interactions on one which will not be present on the other.

To address this gap, there is provided, in accordance with at least one embodiment of the invention, a programmable framework to enable a next generation of telecom analytics, which would be a combination of CDR based telecom analytics with deep, real-time intelligence derived from customer social interactions from online social networking sites (e.g., "Facebook", "Twitter", etc.) to derive a complete understanding of the users so as to enable a proactive personalized service experience for the user in all of his/her service interactions. Further, such a framework would enable the generation of opportunistic leads from a combination of user social network and telecom network data that can provide an opportunity to: improve customer service; serve relevant promotions, products, and services; enable personalized user experience; and proactively prevent churn, engage in potential target acquisition, and find campaign effectiveness.

Figure 4:
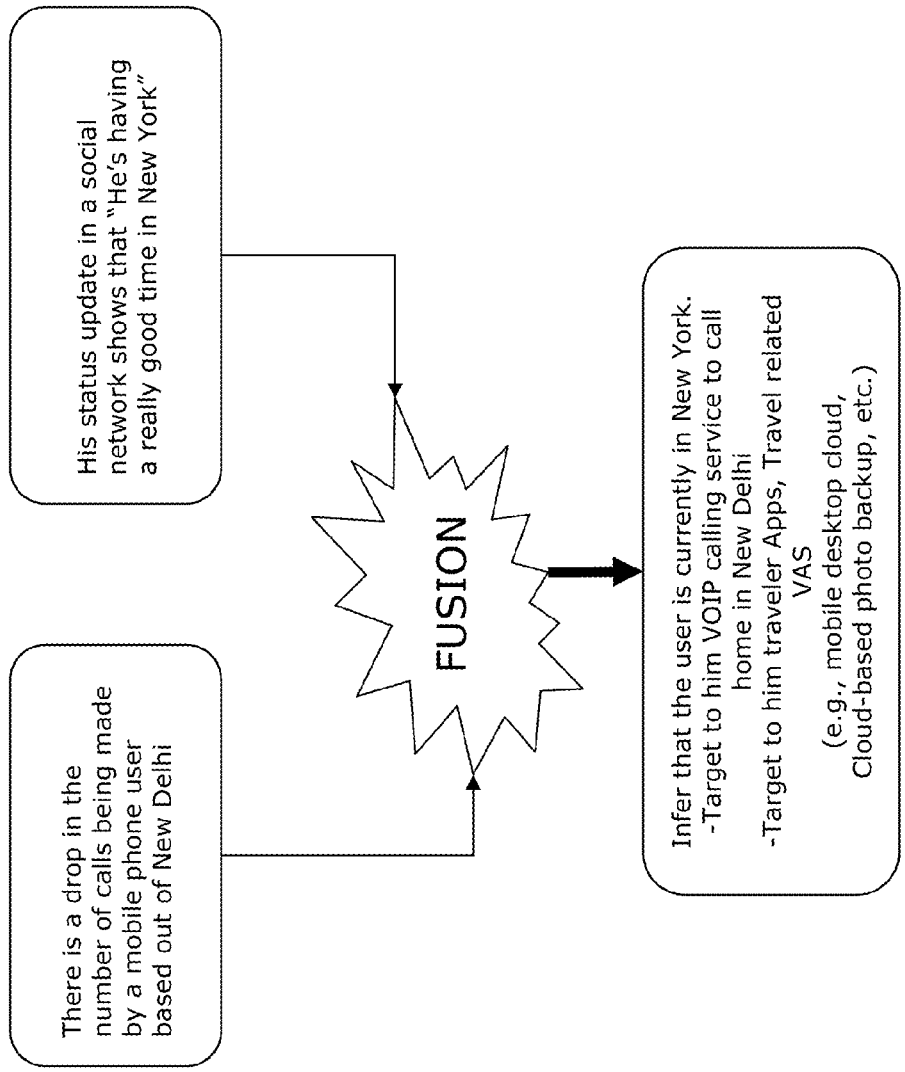
FIG. 4 schematically illustrates a potential use case.

A potential use case in accordance with at least one embodiment of the invention is schematically illustrated in FIG. 4. As shown in the illustrative and non-restrictive example of FIG. 4, it can be detected that there is a drop in the number of calls being made by a mobile phone user based out of New Delhi, while the user's status update in a social network indicates presence in New York. Fusion of this information can create possibilities such as targeting to the user a VOIP (voice over IP) service to call home, conveying to the user traveler apps and other travel-related VAS.

Accordingly, it can be appreciated that, in accordance with at least one embodiment of the invention, a potential for smarter (i.e., more readily targeted or customized) promotions for telco users is brought forth. This can include the use of real time cross domain (telco/OSN) demographics, which would enable smarter promotions. For instance, a retailer might want to position its products to a 15-25 year old male telco user, who is interested in soccer and is currently near the city center. A florist or gift shop might want to position its services to a telco user who has an upcoming friend's birthday in the coming week and stays in Bangalore. A concert organizer might want to get in touch with telco users in the age group 21-35, who are in Bangalore and like to listen to the band that they are organizing a concert for.

In accordance with at least one embodiment of the invention, there are many more potential use cases. Some in the VAS domain include targeted VAS selling and viral VAS marketing through user social network.

For instance, if a user sees comments, ratings or views from friends in a social network against a given VAS or content fragment, he or she may well become more enticed to explore it. Users can then rate, comment on, forward, gift and/or recommend a VAS and/or relevant content. (Content here can be distinguished from a VAS in that the former may form a part of the latter. Thus, by way of example, content could include ringtones, videos, audio clips, text updates, etc.) By way of an illustrative example in accordance with at least one embodiment of the invention, suppose a subscriber never makes any international calls. However, his/her online social network contains people who can be identified as living abroad. Knowing this, the telco can offer products with special international call pricing to entice him/her to make calls and/or send SMS messages to these friends. Thus, getting customers to subscribe to new services can result. This use case can be realized only if both the telecom and online social network information is available about the user, and opportunistic leads are derived from the combination of user OSN and telecom network data.

In accordance with at least one embodiment of the invention, an advantage for the telecom operator would be in allowing the user to know, among other things:

Why the call patterns are changing (dropping); e.g., maybe the user is not well or may be he's trying out a competitor's service.

What the user is planning to do; e.g., maybe he's going on a vacation, maybe he's going on a business tour.

What the user is talking about (regarding this service) to his friends and how is it affecting churn or service uptake.

Who is influencing this customers' usage patterns, who is he influencing and on what basis.

What is influencing this customers' usage behavior, e.g., call rate, service quality and reach, brand value/identity, range of service/product offerings, etc.

In accordance with at least one embodiment of the invention, once an identification is made as to what is influencing usage patterns, it would enable the telco to address issues that are impeding service uptake and to emphasize or advertise those features that are well appreciated. The telco operator could also determine which value added services could be positioned to this user, based on dynamically changing user demographics (e.g., "married", "traveling", "celebrating", etc.) that are currently out of the purview of a telecom operator, and/or his real world interests, activities, overall personality, current situational and social context, etc.

In accordance with at least one embodiment of the invention, advantages can be enjoyed by user authorized retailers and/or other interested third parties. For instance, in addition to these opportunistic leads being used by the Telco operator for its own in-house offerings, these could also be exposed as a set of services to third parties and/or retailers based on explicit user-set preferences and/or a user opt-in facility.

Figure 5:
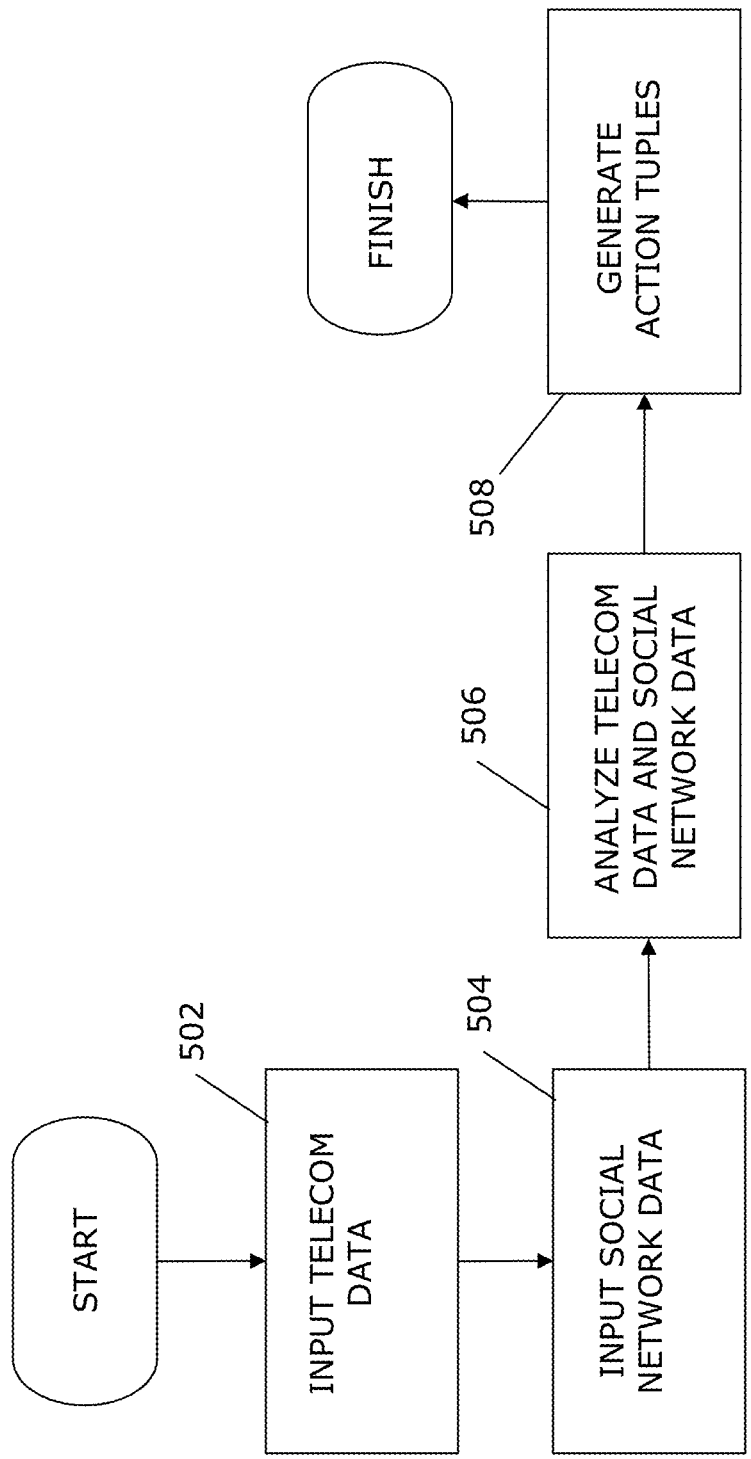
FIG. 5 sets forth a process more generally for analyzing and responding to communications data.

FIG. 5 sets forth a process more generally for analyzing and responding to communications data, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way a processing unit or units and system memory such as those indicated, respectively, at 16' and 28' in FIG. 6.

As shown in FIG. 5, in accordance with at least one embodiment of the invention, telecom data are input (502), as are social network data (504). The telecom data and social network data are analyzed (506), and action tuples are generated based on the analyzed telecom data and social network data (508).

Figure 6:
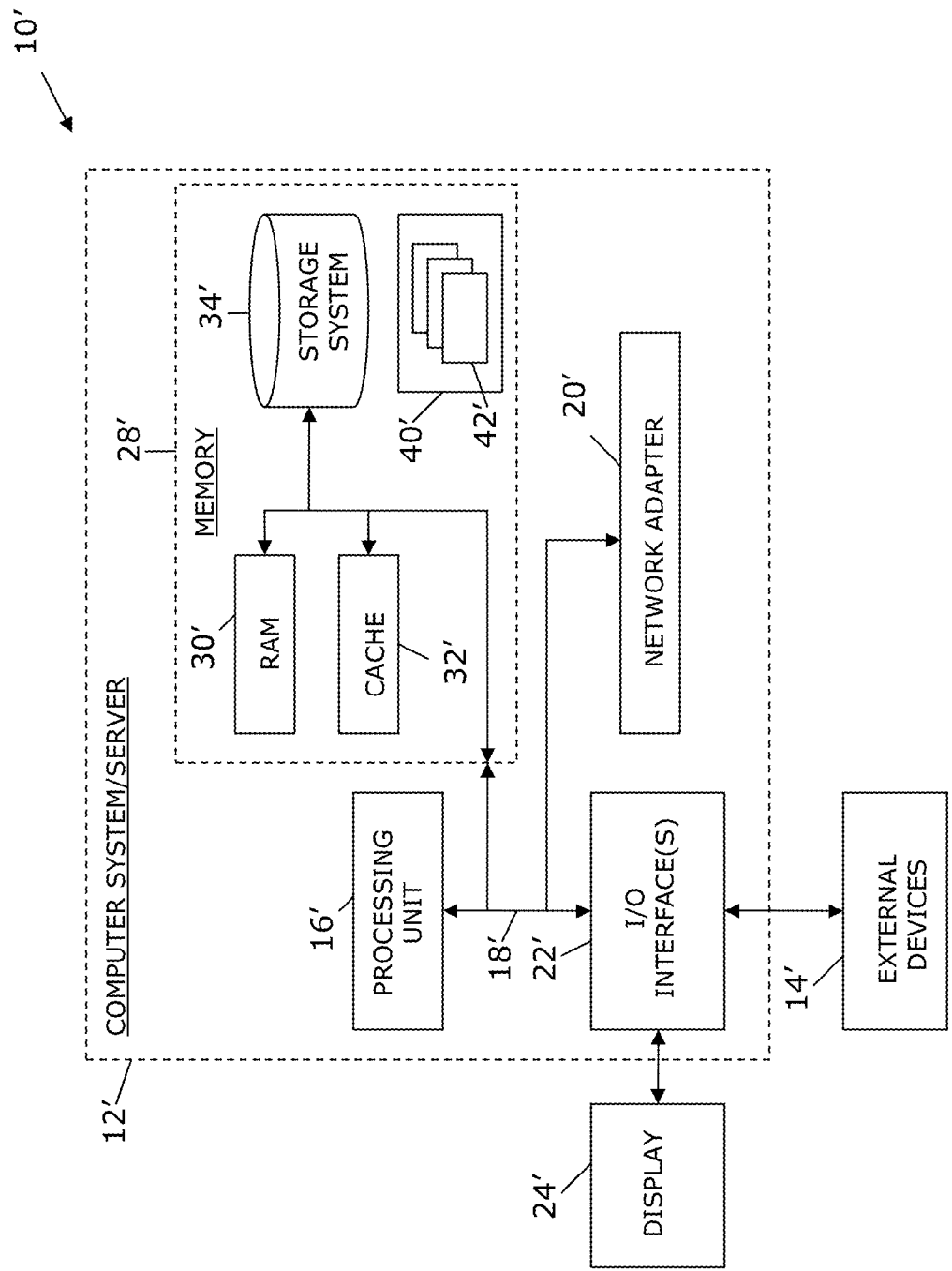
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
inputting telecom data;
inputting social network data;
analyzing the telecom data and the social network data;
generating action tuples based on the analyzed telecom data and the analyzed social network data;
discerning an opportunistic lead;
developing a two-dimensional graph relating to the telecom data and the social network data; and
mapping the opportunistic lead to at least one pattern associated with the two-dimensional graph;
wherein the two-dimensional graph comprises a fused graph of the telecom data and the social network data, and said mapping comprises mapping the opportunistic lead to the fused graph.

2. The method according to claim 1, wherein said analyzing comprises discerning predefined patterns of activities.

3. The method according to claim 1, further comprising linking a user telecom ID with a user social network ID.

4. The method according to claim 1, wherein the opportunistic lead comprises at least one member selected from the group consisting of: an involved user; sentiment of a user; a machine-interpreted reason of generation of the lead; time duration for which the lead is valid; location for which the lead is valid; and an operational entity with potential interest in the lead.

5. The method according to claim 1, wherein said inputting of telecom data comprises inputting data relating to telecom social network activities.

6. The method according to claim 1, wherein said inputting of social network data comprises inputting data relating to online social network activities.

7. The method according to claim 1, comprising storing the opportunistic lead for future use.

8. The method according to claim 7, comprising availing a subscription to the opportunistic lead.

9. An apparatus comprising:
at least one processor; and
a computer readable storage medium having computer readable program code embodied therewith and executable by the at least one processor, the computer readable program code comprising:
computer readable program code configured to input telecom data;
computer readable program code configured to input social network data;
computer readable program code configured to analyze the telecom data and the social network data;
computer readable program code configured to generate action tuples based on the analyzed telecom data and the analyzed social network data; and
computer readable program code is configured to:
discern an opportunistic lead;
develop a two-dimensional graph relating to the telecom data and social network data; and
map the opportunistic lead to at least one pattern associated with the two-dimensional graph;
wherein the two-dimensional graph comprises a fused graph of the telecom data and the social network data, and said mapping comprises mapping the opportunistic lead to the fused graph.

10. A computer program product comprising:
a non-transitory computer readable storage medium having computer readable program code embodied therewith, the computer readable program code comprising:
computer readable program code configured to input telecom data;
computer readable program code configured to input social network data;
computer readable program code configured to analyze the telecom data and the social network data;
computer readable program code configured to generate action tuples based on the analyzed telecom data and the analyzed social network data; and
computer readable program code is configured to:
discern an opportunistic lead;
develop a two-dimensional graph relating to the telecom data and social network data; and
map the opportunistic lead to at least one pattern associated with the two-dimensional graph;
wherein the two-dimensional graph comprises a fused graph of the telecom data and the social network data, and said mapping comprises mapping the opportunistic lead to the fused graph.

11. The computer program product according to claim 1, wherein said computer readable program code is configured to discern predefined patterns of activities.

12. The computer program product according to claim 1, wherein said computer readable program code is configured to link a user telecom ID with a user social network ID.

13. The computer program product according to claim 10, wherein the opportunistic lead comprises at least one member selected from the group consisting of: an involved user; sentiment of a user; a machine-interpreted reason of generation of the lead; time duration for which the lead is valid; location for which the lead is valid; and an operational entity with potential interest in the lead.

14. The computer program product according to claim 1, wherein said computer readable program code is configured to input data relating to telecom and social network activities.

15. The computer program product according to claim 1, wherein said computer readable program code is configured to:
store the opportunistic lead for future use; and
avail a subscription to the opportunistic lead.

16. A method comprising:
inputting telecom data;
inputting social network data;

discerning an opportunistic lead based on the input telecom data and social network data;
developing a two-dimensional graph relating to the telecom data and social network data; and
mapping the opportunistic lead to at least one pattern associated with the two-dimensional graph;
wherein the two-dimensional graph comprises a fused graph of the telecom data and the social network data, and said mapping comprises mapping the opportunistic lead to the fused graph.

* * * * *